US012619606B2

(12) United States Patent
Kulkarni et al.

(10) Patent No.: US 12,619,606 B2
(45) Date of Patent: May 5, 2026

(54) SYSTEM AND METHODS FOR PROCESSING QUERY COMMAND WITHIN DATA WAREHOUSE ARCHITECTURE

(71) Applicant: AkashX Inc., Union City, CA (US)

(72) Inventors: Kartik Kulkarni, Union City, CA (US); Darshan Nagaraj, Berlin (DE)

(73) Assignee: AkashX Inc., Union City, CA (US)

( * ) Notice: Subject to any disclaimer, the term of this patent is extended or adjusted under 35 U.S.C. 154(b) by 8 days.

(21) Appl. No.: 18/759,619

(22) Filed: Jun. 28, 2024

(65) Prior Publication Data

US 2024/0378200 A1    Nov. 14, 2024

Related U.S. Application Data

(60) Provisional application No. 63/619,341, filed on Jan. 10, 2024.

(51) Int. Cl.
*G06F 16/245* (2019.01)
*G06F 16/2453* (2019.01)
*G06F 16/2455* (2019.01)
*G06F 16/28* (2019.01)

(52) U.S. Cl.
CPC .. *G06F 16/24542* (2019.01); *G06F 16/24561* (2019.01); *G06F 16/283* (2019.01)

(58) Field of Classification Search
None
See application file for complete search history.

(56) References Cited

U.S. PATENT DOCUMENTS

| | | | | |
|---|---|---|---|---|
| 11,256,695 B1 * | 2/2022 | He | | G06F 16/2453 |
| 2003/0212668 A1 * | 11/2003 | Hinshaw | | G06F 16/2471 |
| 2007/0050328 A1 * | 3/2007 | Li | | G06F 16/9032 |
| 2008/0114803 A1 * | 5/2008 | Chinchwadkar | .... | G06F 16/8365 |
| | | | | 707/999.102 |
| 2008/0147599 A1 * | 6/2008 | Young-Lai | ........ | G06F 16/24532 |
| 2014/0310259 A1 * | 10/2014 | Tian | | G06F 16/2471 |
| | | | | 707/718 |
| 2018/0046675 A1 * | 2/2018 | Zhou | | G06F 16/24549 |
| 2021/0103589 A1 | 4/2021 | Dageville et al. | | |

(Continued)

FOREIGN PATENT DOCUMENTS

| | | | | | |
|---|---|---|---|---|---|
| CN | 103927346 A | * | 7/2014 | ........ | G06F 16/2456 |
| CN | 110069511 B | * | 10/2021 | .......... | G06F 9/5027 |
| CN | 111064808 B | * | 10/2022 | ......... | H04L 67/1008 |

*Primary Examiner* — Augustine K. Obisesan
(74) *Attorney, Agent, or Firm* — BLANK ROME LLP

(57) ABSTRACT

Embodiments of the disclosure describe a system and method for processing Structured Query Language (SQL) query within data warehouse architecture. The method includes receiving, by nodes associated with an engine layer, a SQL query from a client device, the engine layer indicates a component of the data warehouse architecture. Further, the method includes receiving a topology from a storage layer in response to receiving the SQL query, the topology indicates an arrangement of the stored data among partitions associated with the storage layer. Further, the method includes determining an execution plan tree, the execution plan tree indicates operations to be executed by the engine layer and the storage layer corresponding to the SQL query. The method includes distributing, a fragment of the execution plan tree to the storage layer based on the topology, for processing the operations.

12 Claims, 9 Drawing Sheets

600

Receiving a SQL query from a client device — 602

Receiving a topology from a storage layer in response to receiving the SQL query — 604

Determining an execution plan tree based on correlating the SQL query, a received data volume value, and pre-defined capabilities of the storage layer — 606

Distributing a fragment of the execution plan tree to the storage layer based on the topology, for processing the operations included in the execution plan tree load value such that that the received (fetched) data volume value and a computational load value of the engine layer is reduced — 608

(56)  References Cited

U.S. PATENT DOCUMENTS

| | | | |
|---|---|---|---|
| 2021/0311946 A1* | 10/2021 | Cheng .............. | G06F 16/24542 |
| 2022/0114179 A1* | 4/2022 | Zheng .............. | G06F 16/24524 |
| 2022/0138224 A1 | 5/2022 | Cruanes et al. | |
| 2023/0153295 A1 | 5/2023 | Frantz et al. | |
| 2023/0376485 A1* | 11/2023 | Qu ................... | G06F 16/24535 |

\* cited by examiner

110

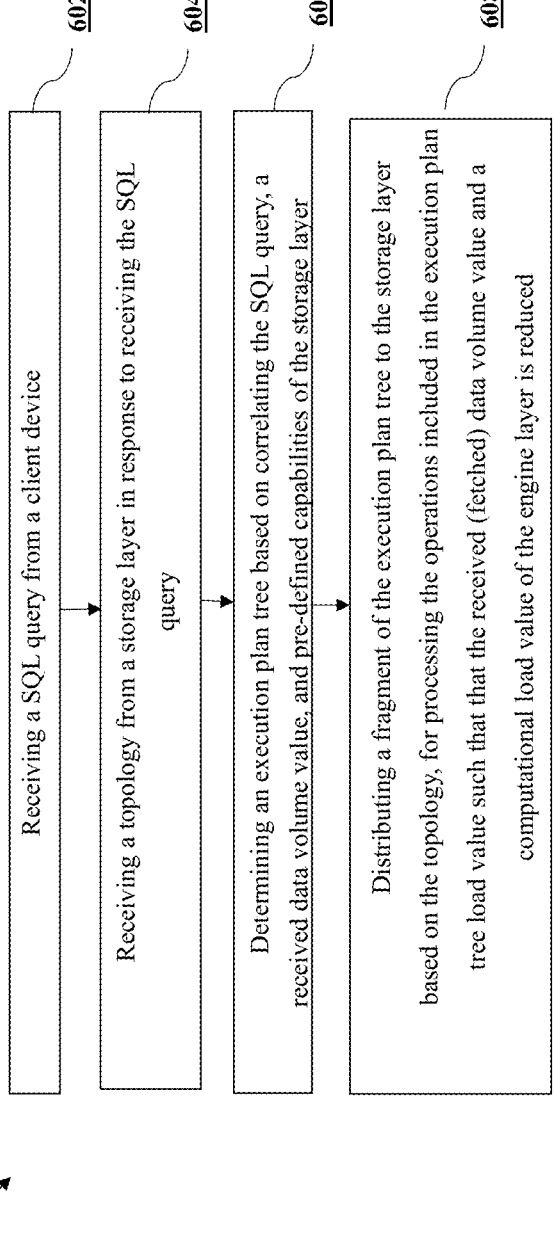

600

602

Receiving a SQL query from a client device

604

Receiving a topology from a storage layer in response to receiving the SQL query

606

Determining an execution plan tree based on correlating the SQL query, a received data volume value, and pre-defined capabilities of the storage layer

608

Distributing a fragment of the execution plan tree to the storage layer based on the topology, for processing the operations included in the execution plan tree load value such that that the received (fetched) data volume value and a computational load value of the engine layer is reduced

Figure 6

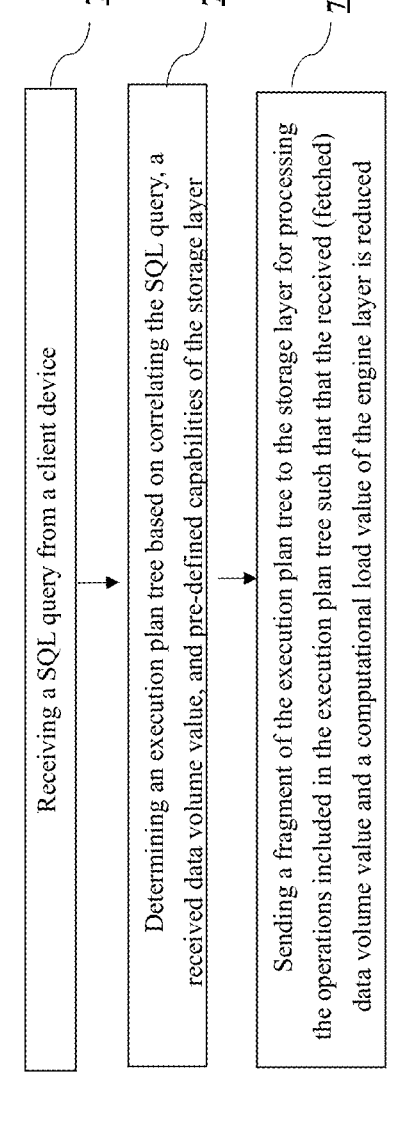

702

Receiving a SQL query from a client device

704

Determining an execution plan tree based on correlating the SQL query, a received data volume value, and pre-defined capabilities of the storage layer

706

Sending a fragment of the execution plan tree to the storage layer for processing the operations included in the execution plan tree such that that the received (fetched) data volume value and a computational load value of the engine layer is reduced

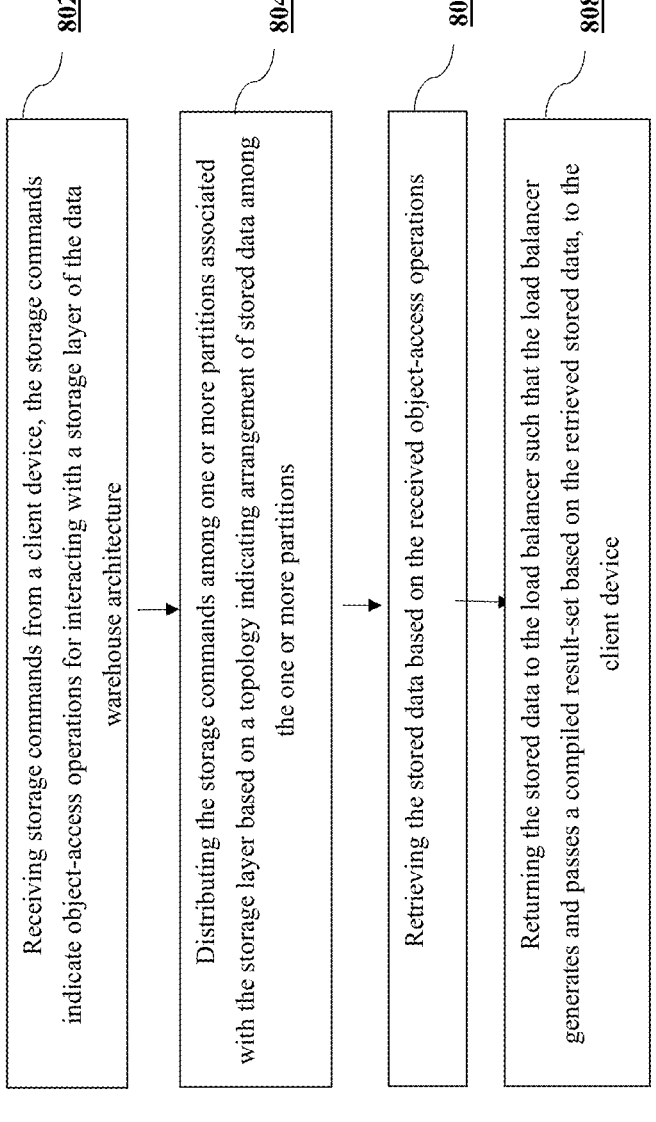

Receiving storage commands from a client device, the storage commands indicate object-access operations for interacting with a storage layer of the data warehouse architecture — 802

Distributing the storage commands among one or more partitions associated with the storage layer based on a topology indicating arrangement of stored data among the one or more partitions — 804

Retrieving the stored data based on the received object-access operations — 806

Returning the stored data to the load balancer such that the load balancer generates and passes a compiled result-set based on the retrieved stored data, to the client device — 808

SYSTEM AND METHODS FOR PROCESSING QUERY COMMAND WITHIN DATA WAREHOUSE ARCHITECTURE

CROSS-REFERENCE TO RELATED APPLICATIONS

This application claims the benefit of priority to U.S. Provisional Patent Application No. 63/619,341, filed Jan. 10, 2024, the contents of which are incorporated herein by reference in their entirety.

FIELD OF THE INVENTION

The disclosure generally relates to query processing engines, and more particularly relates to systems and methods for processing Structured Query Language (SQL) queries within a data warehouse architecture.

BACKGROUND

The data warehouse architecture is a centralized repository that stores huge volumes of data from multiple sources within an organization. Further, the data warehouse is adapted to support business intelligence and analytics activities to provide a foundation for making data-driven decisions. Data warehouses (analytics databases), such as Teradata® were successful in a fast Structured Query Language (SQL) processing over large data volumes. However, such data warehouses had one limitation i.e., data storage and compute resources were tightly coupled. As a result, if the data size increases, such data warehouses are required to increase both the storage and compute resources because compute resources and storage are tightly coupled. However, such data warehouses failed to use all the data for analysis. Thus, the compute resources associated with cold data (information that is infrequently accessed or rarely used) were unused. Further, with exponential growth in data, it became exorbitantly expensive to buy and run such systems.

To solve the aforementioned problems, modern data warehouses, such as Snowflake®, came into business. The architecture of such modern data warehouses is built upon the concept of a compute-storage separation (also referred to as compute-storage disaggregation). In the compute-storage separation, data is permanently stored in cheap and highly scalable cloud storage services, such as Amazon-S3®, and the SQL query engine may be launched on-demand in a temporary, use-and-destroy compute instances that are completely decoupled from the cloud storage. The advantage of such architecture is that the volume of data may become huge and grow perpetually within the cheap and scalable cloud storage. However, the expensive computing resources required for analysis do not have to increase proportionally. Also, only the cloud storage service is required to be always on, but the SQL query engine may be turned on only when some analysis is required to be run.

However, the modern compute-storage-disaggregated architecture has a major problem i.e., the access path between the SQL compute engine and the cloud storage is slow (higher latency and lower bandwidth) than that in the compute-storage-aggregated architecture in which data is stored in the hard drives directly attached to the CPU (as opposed to being separated by a network in between). This problem results in excessive compute consumption by the SQL engines. To satisfy the high-throughput-analysis requirements of the users, the SQL engines typically launch many instances trying to parallelly fetch data from the cloud storage to a local memory and then perform computation on locally fetched data. Since many parallel compute instances may be required to concurrently fetch data from the cloud storage and all such parallel compute instances may spend time waiting for the slow cloud storage to send the data, it may result in high cloud bills when using data warehouses/analytics as compute is the most expensive resource on all the public clouds.

Therefore, in view of the above-mentioned problems, there is a need to provide a method and system for processing the SQL queries within the data warehouse architecture.

SUMMARY

This summary is provided to introduce a selection of concepts, in a simplified format, that are further described in the detailed description of the disclosure. This summary is neither intended to identify key or essential inventive concepts of the disclosure and nor is it intended to determine the scope of the disclosure.

In an embodiment, a method for processing Structured Query Language (SQL) queries within data warehouse architecture is disclosed. The method includes receiving, by one or more nodes associated with an engine layer, an SQL query from a client device, wherein the engine layer indicates a component of the data warehouse architecture configured for receiving, interpreting, optimizing, and executing the SQL query against stored data. Further, the method includes receiving, by the one or more nodes associated with the engine layer, a topology from a storage layer in response to receiving the SQL query, wherein the topology indicates an arrangement of the stored data among one or more partitions associated with the storage layer, wherein the storage layer indicates a component of the data warehouse architecture for storing and managing data. Furthermore, the method includes determining, by the one or more nodes associated with the engine layer, an execution plan tree based on correlating the SQL query, a received data volume value, and pre-defined capabilities of the storage layer, the execution plan tree indicates operations to be executed by the engine layer and the storage layer corresponding to the SQL query. In addition, the method includes distributing, by the one or more nodes associated with the engine layer, a fragment of the execution plan tree to the storage layer based on the topology, for processing the operations included in the execution plan tree such that that the received (fetched) data volume value and a computational load value of the engine layer is reduced.

In another embodiment, a method for processing storage commands within a data warehouse architecture is disclosed. The method includes receiving, by a load balancer associated with the data warehouse architecture, the storage commands from a client device, wherein the storage commands indicate object-access operations for interacting with a storage layer of the data warehouse architecture. Further, the method includes distributing, by the load balancer, the storage commands among one or more partitions associated with the storage layer based on a topology indicating an arrangement of stored data among the one or more partitions. Furthermore, the method includes retrieving, by corresponding one or more partitions, the stored data based on the received object-access operations. In addition, the method includes returning, by the corresponding one or more partitions, the stored data to the load balancer such that the load balancer generates and passes a compiled result-set based on the retrieved stored data, to the client device.

In another embodiment, a method of processing Structured Query Language (SQL) query within data warehouse architecture is disclosed. The method includes receiving, by one or more nodes associated with an engine layer, a SQL query from a client device, wherein the engine layer indicates a component of the data warehouse architecture configured for receiving, interpreting, optimizing, and executing the SQL query against stored data. Further, the method includes determining, by the one or more nodes associated with the engine layer, an execution plan tree based on correlating the SQL query, a received data volume value, pre-defined capabilities of the storage layer, wherein the execution plan tree indicates operations to be executed by the engine layer and the storage layer corresponding to the SQL query. Furthermore, the method includes sending, by the one or more nodes associated with the engine layer, a fragment of the execution plan tree to the storage layer for processing the operations included in the execution plan tree such that the received (fetched) data volume value and a computational load value of the engine layer is reduced.

To further clarify the advantages and features of the methods, systems, and apparatuses, a more particular description of the methods, systems, and apparatuses will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein:

FIG. 6 illustrates a flowchart depicting an embodiment of the method for processing the SQL query within the data warehouse architecture, according to an embodiment of the present disclosure;

FIG. 7 illustrates a flowchart depicting another embodiment of the method for processing the SQL query within the data warehouse architecture, according to an embodiment of the present disclosure; and FIG. 8 illustrates a flowchart depicting a method for processing storage commands within the data warehouse architecture, according to an embodiment of the present disclosure.

Figure 1:
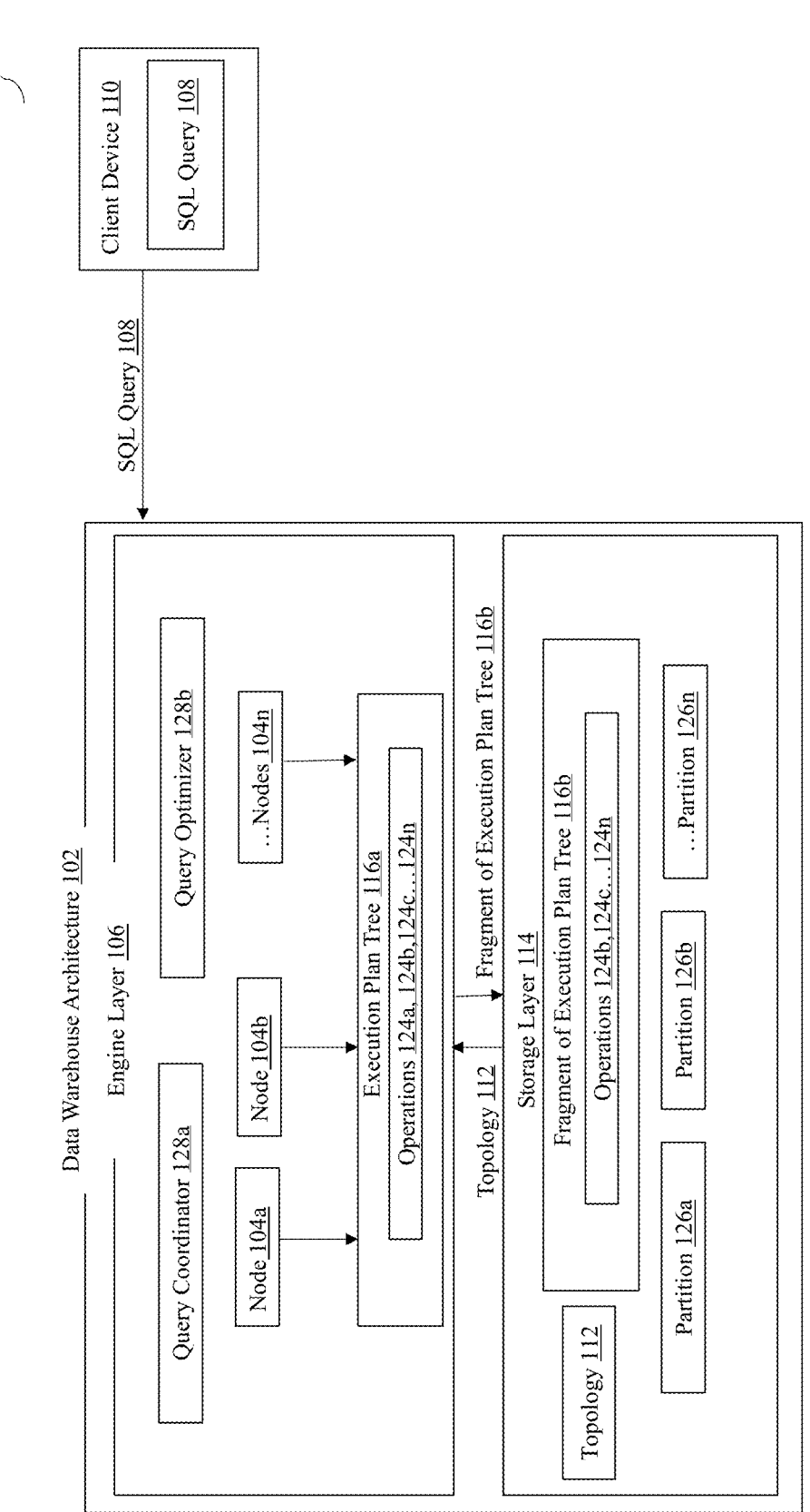
FIG. 1 illustrates an environment for an implementation of a system for processing a Structured Query Language (SQL) query in a data warehouse architecture, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

FIG. 1 illustrates an environment 100 for an implementation of a system for processing a Structured Query Language (SQL) query in a data warehouse architecture 102, according to an embodiment of the present disclosure.

The block diagram 100 may include the data warehouse architecture 102, and a client device 110. The data warehouse architecture 102 may be in communication with the client device 110. Further, the data warehouse architecture 102 may include an engine layer 106 and a storage layer 114. The client device 110 may typically refer to any computing device that interacts with the data warehouse architecture 102 to access, retrieve, or manipulate data. The client device 100 may include, but is not limited to, a desktop computer, a laptop computer, a smartphone or tablet, a wearable device, and the like.

As shown in the engine layer 106, nodes 104a, 104b . . . 104n may be configured to receive the SQL query 108 from the client device 110. In an embodiment, the engine layer 106 may indicate a component of the data warehouse architecture 102 configured for receiving, interpreting, optimizing, and executing the SQL query 108 against stored data. Further, the nodes 104a, 104b . . . 104n associated with the engine layer 106 may be configured to receive a topology 112 from the storage layer 114 in response to receiving the SQL query 108. The topology 112 may indicate an arrangement of the stored data among partitions 126a, 126b . . . 126n associated with the storage layer 114. The storage layer 114 may indicate a component of the data warehouse architecture 102 for storing and managing data. The nodes 104a, 104b . . . 104n in the engine layer 106 and the partitions 126a, 126b . . . 126n in the storage layer 114 may not be intended to be constrained to a specific quantity or configuration, and may vary according to the requirements of the data warehouse architecture 102.

In an embodiment of the present disclosure, the nodes 104a, 104b . . . 104n associated with the engine layer 106 may be configured to determine an execution plan tree 116a, a fragment of execution plan tree 116b based on correlating the SQL query 108, a received data volume value, and pre-defined capabilities of the storage layer. In an embodiment, the node 104a or 104b or 104c . . . 104n may be configured to receive the SQL query 108 as a query coordinator 128a. The query coordinator 128a may be configured to receive and compile the SQL query 108 from the client device 110. The query coordinator 128a may be configured to receive the topology 112 from the storage layer 114 and use the received topology 112 to generate the execution plan tree 116a, 116b. The execution plan tree 116a, 116b may indicate operations 124a, 124b, 124c . . . 124n to be executed by the engine layer 106, and the storage layer 114 corresponding to the SQL query 108. The nodes 104a, 104b . . . 104n associated with the engine layer 106 may be configured to distribute a fragment of the execution plan tree 116b to the storage layer 114 based on the topology 112, for processing the operations 124b, 124c, 124c . . . 124n included in the execution plan tree 116b such that that the received (fetched) data volume value and a computational load value of the engine layer 106 is reduced.

In an embodiment, the storage layer 114 of the data warehouse architecture 102 may be disaggregated and decoupled from the engine layer 106. In a decoupled architecture, the storage layer 114 may perform the operations 124b, 124c, 124c . . . 124n independently of the engine layer 106. The nodes 104a, 104b . . . 104n associated with the engine layer 106 may be configured to distribute the fragment of the execution plan tree 116b to the storage layer 114 based on the topology 112, for processing the operations 124b, 124c, 124c . . . 124n included in the execution plan tree 116b such that that the received (fetched) data volume value and the computational load value of the engine layer 106 is reduced.

In an embodiment, the node 104a or 104b or 104c . . . 104n may be configured to determine the execution plan tree

116a is a query optimizer 128b. In an example, results in the execution plan tree 116a may be annotated with execution markers. The execution markers may inform the engine layer 106 to send execution nodes to the storage layer 114 for the execution.

Figure 2:
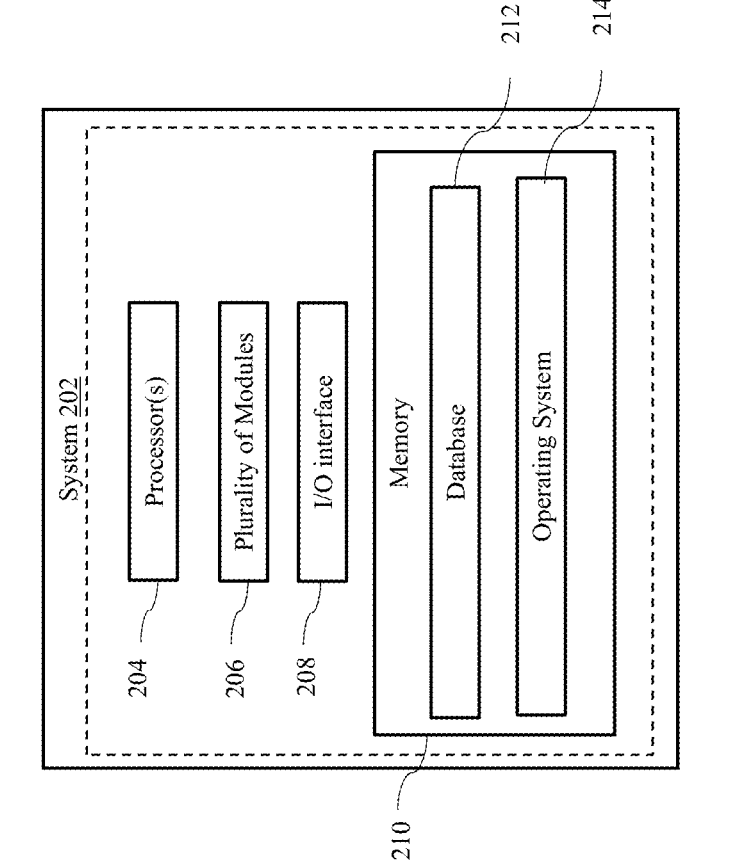
FIG. 2 illustrates a block diagram depicting the system for processing the SQL query within the data warehouse architecture, according to an embodiment of the present disclosure.

FIG. 2 illustrates a block diagram 110 depicting a system 202 for processing SQL query within the data warehouse architecture 102, according to an embodiment of the present disclosure. The system 202 may be hosted on the client device 110. In an exemplary embodiment of the present disclosure, the client device 110 may correspond to a smartphone, a camera, a laptop computer, a desktop computer, or any other device capable of processing the SQL query 108. The client device 110 may include one or more processors 204, a plurality of modules 206, an Input/Output (I/O) interface 208, and a memory 210.

In an exemplary embodiment, the one or more processors 204 may be operatively coupled to each of the plurality of modules 206, the memory 208, and the I/O interface 208. In one embodiment, the one or more processors 204 may include specialized processing units such as integrated system (bus) controllers, memory management control units, floating point units, graphics processing units, digital signal processing units, etc. In one embodiment, the one or more processors 204 may include a central processing unit (CPU), a graphics processing unit (GPU), or both. The one or more processors 204 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors 204 may execute a software program, such as code generated manually (i.e., programmed) to perform the desired operation. In an embodiment of the present disclosure, the one or more processors 204 may be a general-purpose processor, such as the CPU, an application processor (AP), or the like, a graphics-only processing unit such as the GPU, a visual processing unit (VPU), and/or an Artificial Intelligence (AI)—dedicated processor such as a neural processing unit (NPU). In an embodiment of the present disclosure, the one or more processors 404 execute data, and instructions stored in the memory 210 for processing SQL query 108.

The one or more processors 204 may be disposed in communication with one or more input/output (I/O) devices via the respective I/O interface 208. The I/O interface 208 may employ communication code-division multiple access (CDMA), high-speed packet access (HSPA+), global system for mobile communications (GSM), long-term evolution (LTE), WiMax, or the like, etc.

Using the I/O interface 208, the system 202 may communicate with one or more I/O devices, specifically, the user devices associated with the human-to-human conversation. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc. In an embodiment of the present disclosure, the the I/O interface 208 may display at least one or the one or more corroded parts of the metal, the one or more non-corroded parts of the metal, and the calculated percentage of the corrosion on a user interface screen of the electronic device 100.

The one or more processors 204 may be disposed of in communication with a communication network via a network interface. In an embodiment, the network interface may be the I/O interface 208. The network interface may connect to the communication network to enable connection of the system 202 with the outside environment. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, and the like.

In some embodiments, the memory 210 may be communicatively coupled to the one or more processors 204. The memory 210 may be configured to store the data, and the instructions executable by the one or more processors 404 for processing the SQL query 108 within the data warehouse architecture 102. Further, the memory 210 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 210 may include a cache or random-access memory for the one or more processors 204. In alternative examples, the memory 210 is separate from the one or more processors 204, such as a cache memory of a processor, the system memory, or other memory. The memory 210 may be an external storage device or database for storing data. The memory 210 may be operable to store instructions executable by the one or more processors 204. The functions, acts, or tasks illustrated in the figures or described may be performed by the programmed processor/controller for executing the instructions stored in the memory 210. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

In some embodiments, the plurality of modules 206 may be included within the memory 210. The memory 210 may further include a database 212 to store the data for processing the SQL query 108. The plurality of modules 206 may include a set of instructions that may be executed to cause the system 202 to perform any one or more of the methods/processes disclosed herein. The plurality of modules 206 may be configured to perform the steps of the present disclosure using the data stored in the database 212 for processing the SQL query 108, as discussed herein. In an embodiment, each of the plurality of modules 206 may be a hardware unit that may be outside the memory 210. Further, the memory 210 may include an operating system 414 for performing one or more tasks of the client device 110, as performed by a generic operating system 214 in the communications domain. In one embodiment, the database 212 may be configured to store the information as required by the plurality of modules 206 and the one or more processors 204 for processing the SQL query 108.

For example, the database 212 may store processed results, and the compiled result-set, data volume value, the pre-defined capabilities of the storage layer, the computational value, and the like. The database 212 may facilitate the display of relevant information on the user interface screen of the client device 110. The database 212 supports efficient data retrieval, processing, and presentation on the user interface contributing to information decision-making regarding the processed SQL query 108.

Further, the present disclosure also contemplates a computer-readable medium that includes instructions or receives and executes instructions responsive to a propagated signal. Further, the instructions may be transmitted or received over the network via a communication port or interface or using a bus (not shown). The communication port or interface may be a part of the one or more processors 204 or may be a separate component. The communication port may be created in software or may be a physical connection in hardware. The communication port may be configured to connect with a network, external media, the display, or any other components in the client device 110, or combinations thereof. The connection with the network may be a physical connection, such as a wired Ethernet connection, or may be established wirelessly. Likewise, the additional connections with other components of the client device 110 may be physical or may be established wirelessly.

In an embodiment of the present disclosure, the processor 204 is in communication with the memory 210. The processor 204 may be configured to receive the SQL query 108 from the client device 110 using the nodes 104a, 104b . . . 104n associated with the engine layer 106. The engine layer 106 may indicate a component of the data warehouse architecture 102 configured for receiving, interpreting, optimizing, and executing the SQL query 108 against stored data. Further, the nodes 104a, 104b . . . 104n associated with the engine layer 106 may be configured to receive the topology 112 from the storage layer 114 in response to receiving the SQL query 108. The topology 112 may indicate the arrangement of the stored data among the partitions 126a, 126b . . . 126n associated with the storage layer 114. The storage layer 114 may indicate a component of the data warehouse architecture 102 for storing and managing data.

Figure 3A:
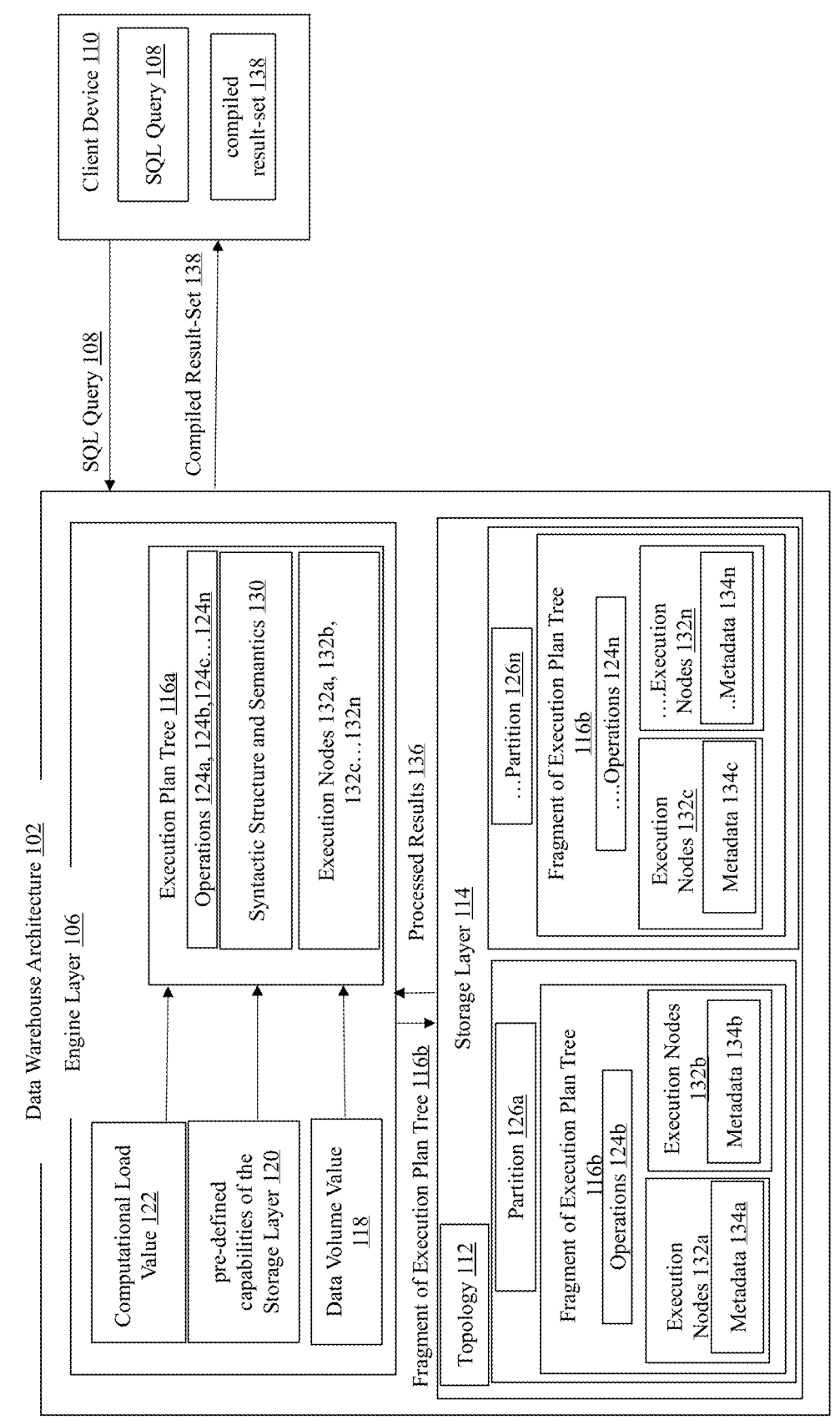
FIG. 3A illustrates a process flow of SQL query in the data warehouse architecture with a storage layer and an engine layer, according to an embodiment of the present disclosure.

FIG. 3A illustrates a process flow 300a of SQL query in the data warehouse architecture 102 with the storage layer 114 and the engine layer 106, according to an embodiment of the present disclosure.

In an embodiment of the present disclosure, the engine layer 106 may be configured to parse the received SQL query 108, indicating determining syntactic structure and semantics 130 corresponding to the received SQL query 108. In an embodiment, the syntactic structure and semantics 130 may be configured to grammatically correct the SQL query 108 according to SQL language rules, while parsing involves understanding the meaning and purpose of the query components within the context of the database schema and user intent. The syntactic structure and semantics 130 may be essential for accurately processing and executing the SQL queries within the data warehouse architecture 102. Further, the engine layer 106 may be configured to optimize the received SQL query 108 to determine the received data volume value 118 indicating the amount of data volume that the storage layer 114 sends to the engine layer 106 for processing the received SQL query 108. The engine layer 106 may be configured to receive the pre-defined capabilities 120. In an embodiment, the pre-defined capabilities may indicate computation characteristics of the storage layer 114. Furthermore, the engine layer 106 may be configured to correlate the SQL query 108, the received data volume value 118, and the pre-defined capabilities of the storage layer 120 to assign the operations 124*b*, 124*c* . . . 124*n* for processing the received SQL query 108 to the engine layer 106 and the storage layer 116. In addition, the engine layer 106 may be configured to determine the execution plan tree 116*a*, and 116*b* based on the correlation.

In an embodiment of the present disclosure, the nodes 104*a*, 104*b* . . . 104*n* associated with the engine layer 106 may be configured to identify the execution nodes 132*a*, 132*b*, 132*c* . . . 132*n* in the execution plan tree 116*b* assigned to the storage layer 114. Each of the execution nodes 132*a*, 132*b*, 132*c* . . . 132*n* may include metadata 134*a*, 134*b*, 134*c* . . . 134*n* thereby required for processing the received SQL query 108. The metadata 134*a*, 134*b*, 134*c* . . . 134*n* may indicate operation codes or functions for each of the plurality of execution nodes 132*a*, 132*b*, 132*c* . . . 132*n*, a catalog content, list of objects, filters, predicates, projections, and the data types.

Further, the nodes 104*a*, 104*b* . . . 104*n* associated with the engine layer 106 may be configured to send the fragment of the execution plan tree 116*b* to the storage layer 116 based on the identification of the execution nodes 132*a*, 132*b*, 132*c*, 132*d* and the topology 112 such that the nodes 104*a*, 104*b* . . . 104*n* associated with the engine layer 106 sends the fragment of the execution plan tree 116*b* to a corresponding partitions 126*a*, 126*b* . . . 126*n* associated with the storage layer 114. In an embodiment, the fragment of the execution plan tree 116*b* may include the execution nodes 132*a*, 132*b*, 132*c*, 132*d* . . . 132*n*. In another embodiment, the fragment of the execution plan tree 116*b* may include an individual execution node 132*a* or 132*b* or 132*c* or 132*d* . . . 132*n*. In an embodiment, the execution nodes 132*a*, 132*b*, 132*c*, . . . 132*n* may be executed on the storage layer 114 that includes data (for example, a list of objects identified by keys). The result of the execution nodes 132*a*, 132*b*, 132*c*, . . . 132*n* may be sent to a parent node 132*a* or 132*b* or 132*c* or 132*d* or . . . 132*n* and serve as an input to a function associated with the parent node 132*a* or 132*b* or 132*c* or . . . 132*n*. bottom-to-top reverse-recursive execution of the nodes 132*a*, 132*b*, 132*c*, . . . 132*n* may be done until the top node is reached 132*a* or 132*b* or 132*c* or . . . 132*n*. For example, the top node 132*a* or 132*b* or 132*c* or . . . 132*n* may send the processed results 136 to the engine layer 106 from the storage layer 114.

In an embodiment of the present disclosure, the storage layer 116 may be configured to process the operations 124*b*, 124*c*, 124*d* . . . 124*n* corresponding to the fragment of the execution plan tree 116*b*. Further, the storage layer 116 may be configured to send the processed results 136 to the engine layer 106 thereby reducing the received data volume value 118 and the computational load value 122 of the engine layer 106. Further, the engine layer 106 may be configured to generate a compiled result-set 138 by associating the processed results received by the storage layer 114 and computed results of the engine layer 106 thereby passing the compiled result-set 138 to the client device 110. The compiled result-set 138 may refer to a structured collection of data that has been processed, aggregated, or computed by the engine layer 106 in response to the SQL query 108 from the client device 110. In an embodiment, the engine layer 106 may be responsible for generating the compiled result-set 138 by combining the processed results 136 received from the storage layer 114 with computed results generated within the engine layer 106. The computed results may include aggregated values, calculated fields, or other transformations applied to the retrieved data.

In an embodiment, an interface between the storage layer 114 and the engine layer 106 may allow pushing down either leaf nodes or sub-tree of plan execution using the execution plan tree 116*a*. The execution nodes 132*a*, 132*b*, 132*c* . . . 132*n* may encapsulate the operations 124*b* . . . 124*n*. The operations 124*b* . . . 124*n* may include but are not limited to, selection, filtration, projection, sorting, group by, arithmetic operation, and the like. The operations 124*b* . . . 124*n* may be executed on a specific set of objects (whose keys may include within the node). The data structure may allow sequentially and hierarchically organizing execution logic and allow parallel execution.

Figure 3B:
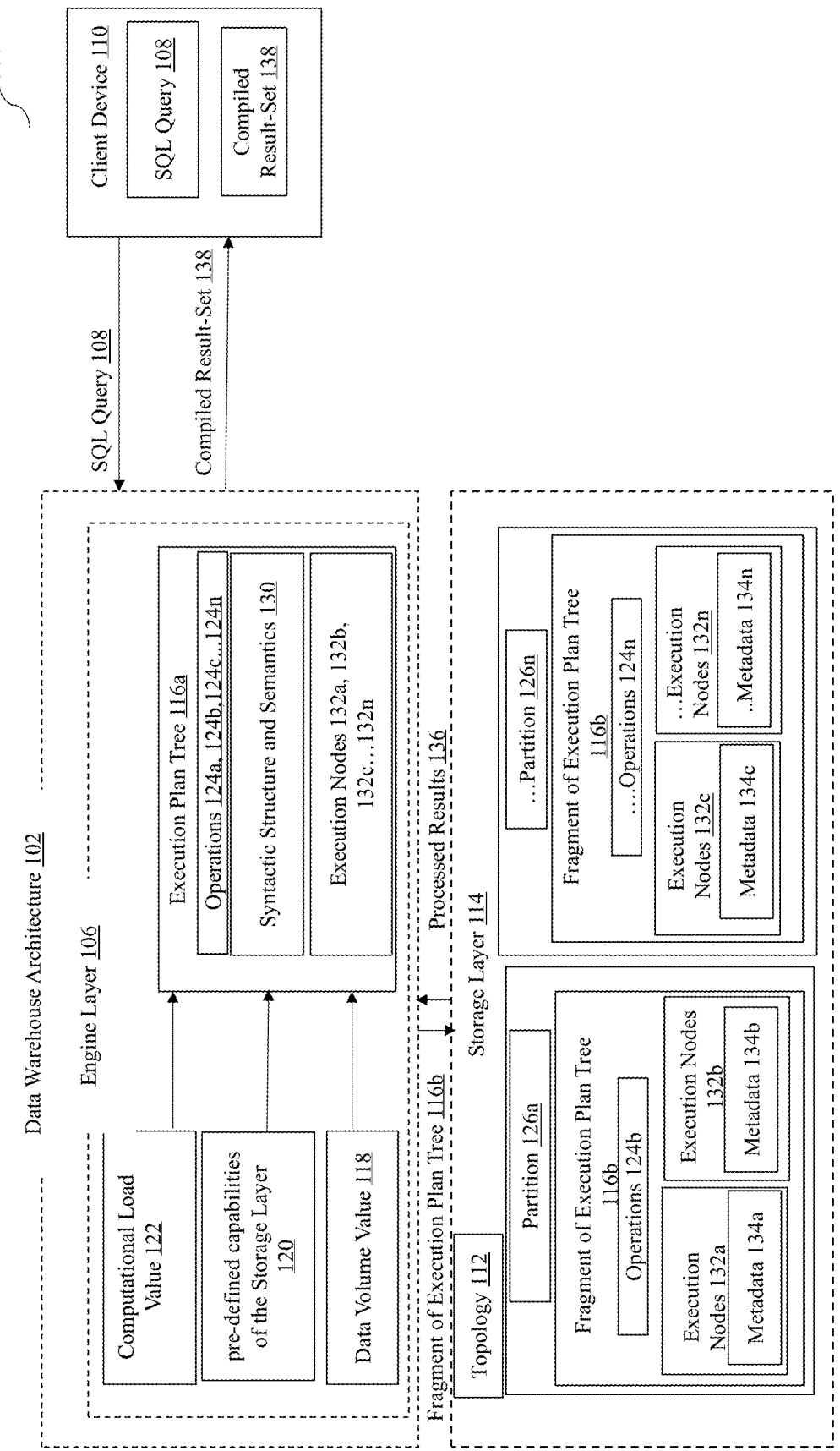
FIG. 3B illustrates a process flow of SQL query in the data warehouse architecture with the storage layer that is disaggregated and decoupled from the engine layer, according to an embodiment of the present disclosure.

FIG. 3B illustrates a process flow 300*b* of SQL query in the data warehouse architecture 102 with the storage layer 114 that is disaggregated and decoupled from the engine layer 106, according to an embodiment of the present disclosure.

As shown in FIG. 3B, the storage layer 114 of the data warehouse architecture 102 may be disaggregated and decoupled from the engine layer 106. In a decoupled architecture, the storage layer 114 may perform operations 124*b*, . . . 124*n* independently of the engine layer 106. Decoupling may involve breaking down storage-related functionalities into discrete components. The discrete components may include, but are not limited to, data storage, data retrieval, data management functions, and the like.

Figure 4:
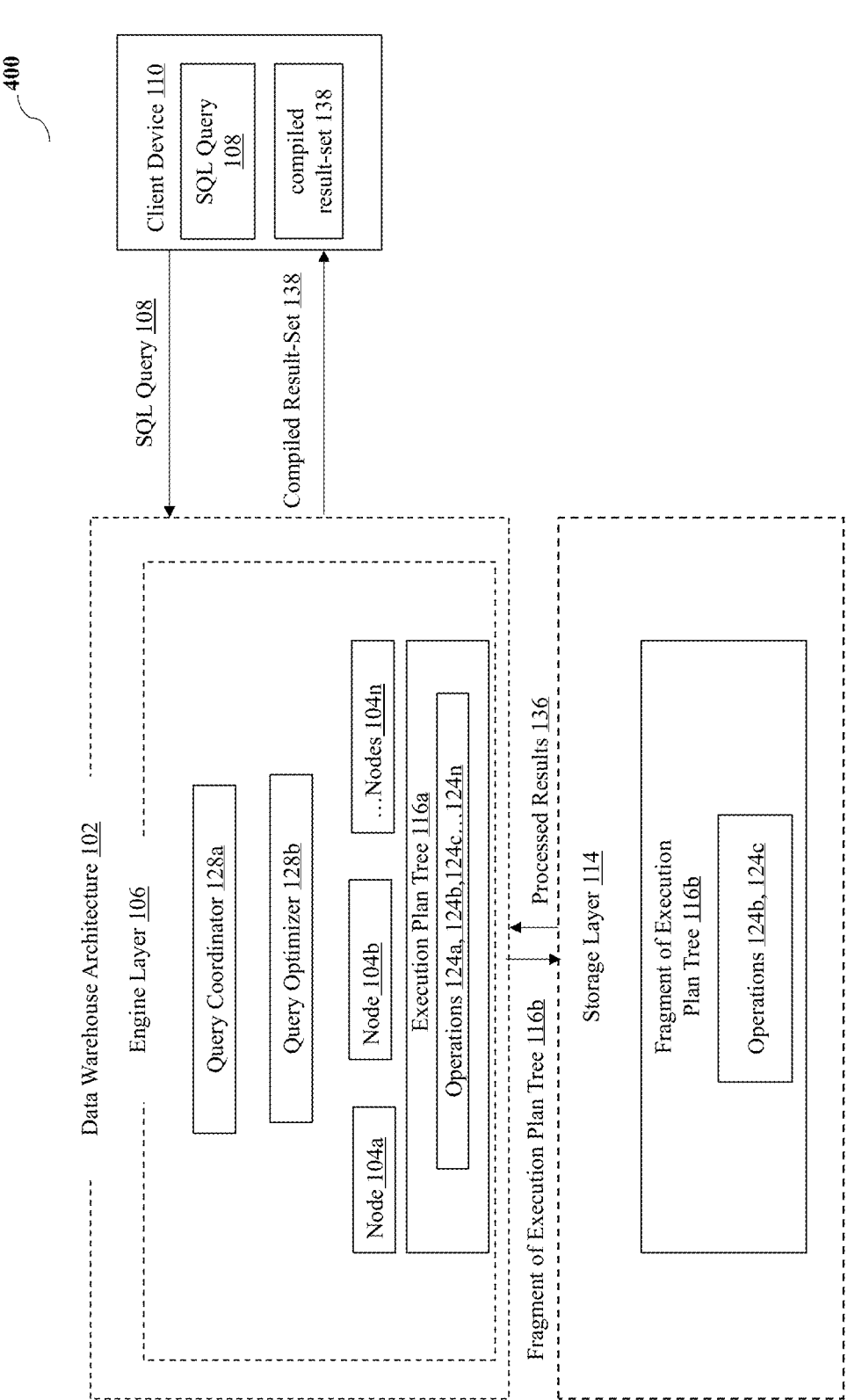
FIG. 4 illustrates a process flow of SQL query in the data warehouse architecture with the storage layer that is disaggregated and decoupled from an engine layer without exchanging a topology, according to an embodiment of the present disclosure.

FIG. 4 illustrates a process flow 400 of SQL query in the data warehouse architecture 102 with the storage layer 114 that is disaggregated and decoupled from the engine layer 106 without exchanging the topology 112, according to an embodiment of the present disclosure. In an embodiment, the nodes 104*a*, 104*b* . . . 104*n* associated with an engine layer 106 may be configured to receive the SQL query 108 from the client device 110. The engine layer 106 may indicate the component of the data warehouse architecture 102 configured for receiving, interpreting, optimizing, and executing the SQL query 108 against stored data. The nodes 104*a*, 104*b* . . . 104*n* associated with the engine layer 106 may be configured to determine the execution plan tree 116*a* based on correlating the SQL query 108, the received data volume value 118, and the pre-defined capabilities of the storage layer 120. The execution plan tree 116*a*, 116*b* may indicate the operations 124*b* . . . 124*n* to be executed by the engine layer 106 and the storage layer 116 corresponding to the SQL query 108. In an embodiment, further, the nodes 104*a*, 104*b* . . . 104*n* associated with the engine layer 106 may be configured to send the fragment of the execution plan tree 116*b* to the storage layer 114 for processing the operations 124*b* . . . 124*n* included in the execution plan tree 116*a* such that that the received (fetched) data volume value 118 and the computational load value 122 of the engine layer 106 is reduced.

Figure 5:
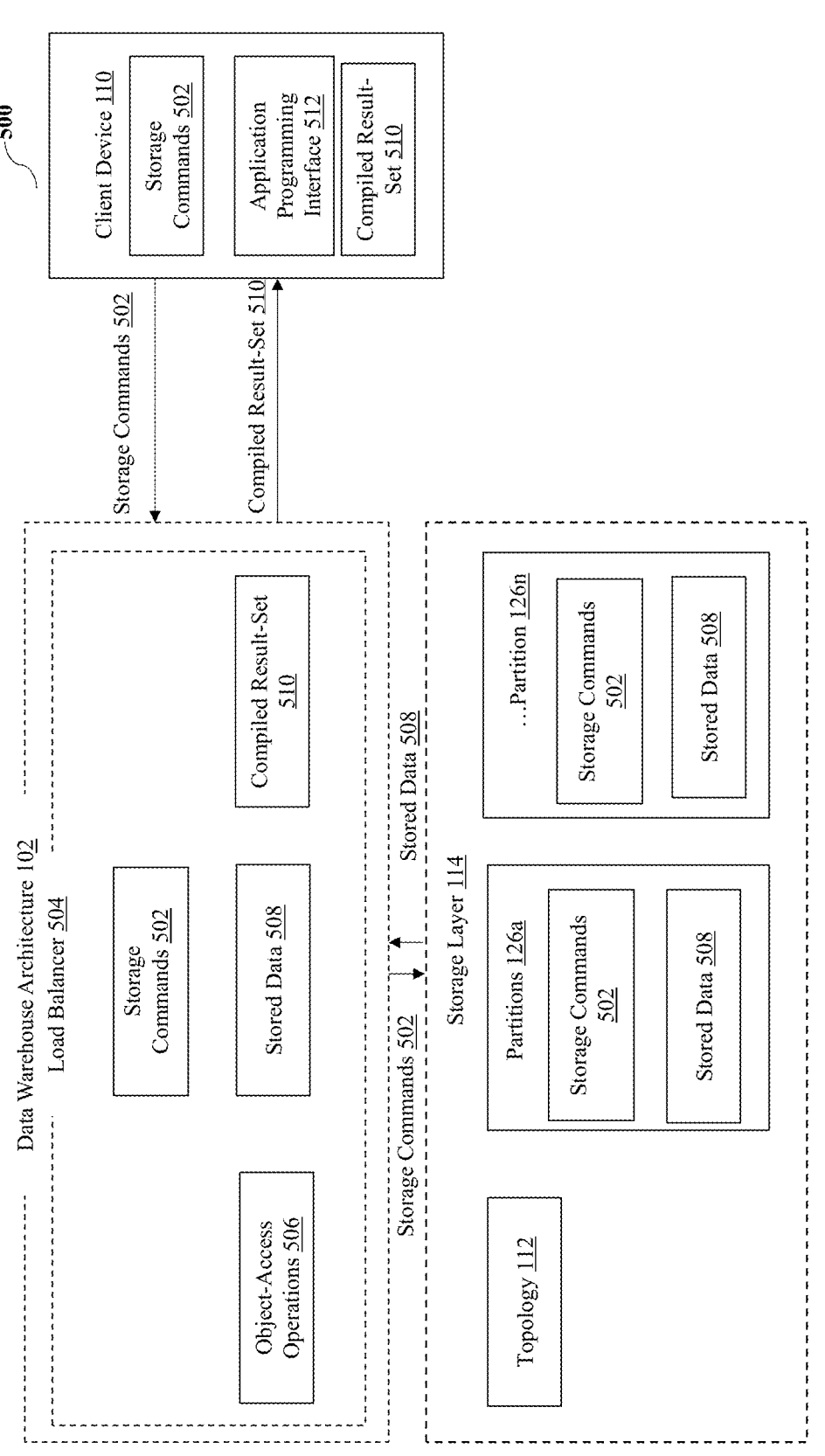
FIG. 5 illustrates a process flow of SQL query in the data warehouse architecture with the storage layer that is disaggregated and decoupled from a load balancer, according to an embodiment of the present disclosure.

FIG. 5 illustrates a process flow 500 of SQL query in the data warehouse architecture 102 with the storage layer 114 that is disaggregated, decoupled, and is in communication with the load balancer 504, according to an embodiment of the present disclosure. The data warehouse architecture 102 may include the load balancer 504, and the storage layer 114, in communication with each other. The load balancer 504 associated with the data warehouse architecture 102 may be configured to receive storage commands 502 from the client device 110. In an embodiment, the client device 110 may be configured to interact via an Application Programming Interface (API) 512, thereby the compiled result-set 310 may be generated in a format specified by the API 512, such that consistency and compatibility with applications that interact with the storage layer 114 of the data warehouse architecture 102 is maintained.

The storage commands 502 may indicate object-access operations 506 for interacting with the storage layer 114 of the data warehouse architecture 102. In an example, the object-access operations 506 may correspond to at least one of a create operation, a read operation, an update operation, and a delete operation, wherein the object-access operations 506 are performed on the stored data in the storage layer 114. The object-access operations 506 goes through the load balancer 504, which may co-located inside the storage layer 114 or in a stand-alone instance. In an embodiment, when the object-access operation 506 reaches a storage node, the storage node may return locally stored data or in rare cases (large objects) may do remote fetch. The load balancer 504 may be configured to distribute the storage commands 502 among the partitions 126a, 126b associated with the storage layer 114 based on the topology 112 indicating arrangement of stored data among the partitions 126a, 126b. The corresponding partitions 126a and 126b may be configured to retrieve the stored data based on the received object-access operations 506. Further, the corresponding partitions 126a and 126b may be configured to return the stored data to the load balancer 504 such that the load balancer 504 generates and passes the compiled result-set 310 based on the retrieved stored data, to the client device 110.

In an embodiment of the present disclosure, the load balancer 504 may be configured to select the partitions 126a and 126b based on the topology 112 to receive the storage commands 502 for performing the object-access operations 506 such that the load balancer 504 recognizes which of the partitions 126a, 126b corresponds to the stored data matching the storage command 502. Further, the load balancer 504 may be configured to send the storage commands 502 for performing object-access operations 506 to the corresponding partitions 126a, and 126b associated with the storage layer 114. In an embodiment, the storage layer 114 of the data warehouse architecture 102 may perform replication across the partitions 126a, 126b, 126c . . . 126n.

Now referring to FIG. 6, an embodiment of a method 600 for processing the SQL query 108 within the data warehouse architecture 102, according to an embodiment of the present disclosure. In an embodiment of the present disclosure, the method 600 may be performed by the system 202, as explained with reference to FIG. 2. For sake of brevity, technical implementations as explained in FIG. 1, FIG. 2, FIG. 3, FIG. 4, and FIG. 5 are omitted herein.

At step 602, the method 600 may include receiving, by the nodes 104a, 104b, 104c . . . 104n associated with the engine layer 106, the SQL query 108 from the client device 110. In an embodiment, the engine layer 106 may indicate the component of the data warehouse architecture 102 configured for receiving, interpreting, optimizing, and executing the SQL query 108 against stored data.

At step 604, the method 600 may include receiving, by the nodes 104a, 104b, 104c . . . 104n associated with the engine layer 106, the topology 112 from the storage layer 114 in response to receiving the SQL query 108. In an embodiment, the topology 112 may indicate the arrangement of the stored data among the partitions 126a, and 126b associated with the storage layer 114. The storage layer 114 may indicate the component of the data warehouse architecture 102 for storing and managing data.

At step 606, the method 600 may include determining, by the nodes 104a, 104b, 104c . . . 104n associated with the engine layer 106, the execution plan tree 116a based on correlating the SQL query 108, the received data volume value 118, and the pre-defined capabilities of the storage layer 120. The execution plan tree 116a may indicate the operations 124a, 124b, and 124c to be executed by the engine layer 106 and the storage layer 114 corresponding to the SQL query 108.

At step 608, the method 600 may include distributing, by the nodes 104a, 104b, 104c . . . 104n associated with the engine layer 106, the fragment of the execution plan tree 116b to the storage layer 114 based on the topology 112, for processing the operations 124a, 124b, 124c . . . 124n included in the execution plan tree 116a such that that the received (fetched) data volume value 118 and the computational load value 122 of the engine layer 106 is reduced.

Now referring to FIG. 7, another embodiment of a method 700 for processing the SQL query 108 within the data warehouse architecture 102, according to an embodiment of the present disclosure. For the sake of brevity, technical implementations as explained in FIG. 1, FIG. 2, FIG. 3, FIG. 4, and FIG. 5 are omitted herein.

At step 702, the method 700 may include receiving, by the nodes 104a, 104b, 104c . . . 104n associated with the engine layer 106, the SQL query 108 from the client device 110. The engine layer 106 may indicate the component of the data warehouse architecture 102 configured for receiving, interpreting, optimizing, and executing the SQL query 108 against the stored data.

At step 704, the method 700 may include determining, by the nodes 104a, 104b, 104c . . . 104n associated with the engine layer 106, the execution plan tree 116a, 116b based on correlating the SQL query 108, the received data volume value 118, the pre-defined capabilities of a storage layer 120. The execution plan tree 116a, 116b may indicate the operations 124a, 124b, 124c . . . 124n to be executed by the engine layer 106 and the storage layer 114 corresponding to the SQL query 108.

At step 706, the method 700 may include sending, by the nodes 104a, 104b, 104c . . . 104n associated with the engine layer 106, the fragment of the execution plan tree 116b to the storage layer 114 for processing the operations 124b, 124c . . . 124n included in the execution plan tree 116a such that that the received (fetched) data volume value 118, and the computational load value 122 of the engine layer 106 is reduced.

In an embodiment of the present disclosure, the method 700 includes parsing, by the engine layer 106, the received SQL query 108, indicating determining syntactic structure and semantics 130 corresponding to the received SQL query 108.

The method 700 may include optimizing, by the engine layer 106, the received SQL query 108 to determine the received data volume value 118 indicating amount of data volume that the storage layer 114 sends to the engine layer 106 for processing the received SQL query 108.

The method 700 may include receiving, by the engine layer 106, the pre-defined capabilities 120 indicating a computation characteristics of the storage layer 114. The method 700 may include correlating the SQL query 108, the received data volume value 118, and the pre-defined capabilities of the storage layer 120 to assign the operations 124a, 124b, 124c . . . 124n for processing the received SQL query 108 to the engine layer 106 and the storage layer 114. The method 700 includes determining the execution plan tree 116a, and 116b based on the correlation.

In an embodiment of the present disclosure, the method 700 may include distributing the fragment of the execution plan tree 116b to the storage layer 114 based on the topology 112 includes identifying the execution nodes 132a, 132b, 132c, 132d in the execution plan tree 116b assigned to the storage layer 114. The method 600 may include sending the fragment of the execution plan tree 116*b* to the storage layer 114 based on the identification and topology 112 such that the nodes 104*a*, 104*b* . . . 104*n* associated with the engine layer 106 send the fragment of the execution plan tree 116*b* to the corresponding partitions 126*a*, 126*b* associated with the storage layer 114. The fragment of the execution plan tree 116*b* may include the individual execution node 132*a* or 132*b* or 132*c* or 132*d* or a plurality of execution nodes 132*a*, 132*b*, 132*c*, 132*d*. In an embodiment, each of the execution nodes 132*a*, 132*b*, 132*c*, and 132*d* may include the metadata 134*a*, 134*b*, 134*c* . . . 134*n* thereby required for processing the received SQL query 108. The metadata 134*a*, 134*b*, 134*c* . . . 134*n* may indicate the operation codes or functions for each of the execution nodes 132*a*, 132*b*, 132*c* . . . 132*n*, catalog content, list of objects, filters, predicates, projections, and data types.

According to exemplary embodiments of the present disclosure, the method 700 for generating a compiled result-set by associating the processed results. The method 700 may include processing, by the storage layer 114, the operations 124*a*, 124*b*, 124*c* . . . 124*n* corresponding to the fragment of the execution plan tree 116*b*. The method 700 may include sending, by the storage layer 114, the processed results 136 to the engine layer 106 thereby reducing the received data volume value 118 and the computational load value 122 of the engine layer 114. The method 700 may include generating, by the engine layer 106, the compiled result-set 138 by associating the processed results 136 received by the storage layer 114 and computed results of the engine layer 106 thereby passing the compiled result-set 138 to the client device 110.

Now referring to, FIG. 8 illustrates a flowchart 800 depicting a method for processing the storage commands within the data warehouse architecture 102, according to an embodiment of the present disclosure. For sake of brevity, technical implementations as explained in FIG. 1, FIG. 2, FIG. 3, FIG. 4, and FIG. 5, are omitted herein.

At step 802, the method 800 may include receiving, by the load balancer 504 associated with the data warehouse architecture 102, the storage commands 502 from the client device 110. The storage commands 502 may indicate the object-access operations 506 for interacting with the storage layer 114 of the data warehouse architecture 102.

At step 804, the method 800 may include distributing, by the load balancer 504, the storage commands 502 among the partitions 126*a*, and 126*b* associated with the storage layer 114 based on the topology 112 indicating the arrangement of stored data 508 among the partitions 126*a*, 126*b*.

In an embodiment of the present disclosure, the method 800 may include selecting the partitions 126*a*, and 126*b* based on the topology 112 to receive the storage commands 502 for performing the object-access operations such that the load balancer recognizes which of the partitions 126*a*, 126*b* corresponds to the stored data matching the storage command 502. The method 800 may include sending the storage commands 502 for performing the object-access operations 506 to the corresponding partitions 126*a*, and 126*b* associated with the storage layer 114.

At step 806, the method 800 may include retrieving, by the corresponding partitions 126*a*, and 126*b*, the stored data based on the received object-access operations. In an embodiment, the object-access operations 506 may indicate at least one of a create operation, a read operation, an update operation, and a delete operation, the object-access operations 506 may be performed on the stored data in the storage layer 114.

At step 808, the method 800 may include returning, by the corresponding partitions 126*a*, 126*b*, the stored data to the load balancer 504 such that the load balancer 504 generates and passes the compiled result-set 310 based on the retrieved stored data, to the client device 110.

In an embodiment of the present disclosure, the method 800 may include the client device 110 may interact via the Application Programming Interface (API) 512, thereby the compiled result-set 510 is generated in a format specified by the API 512, such that consistency and compatibility with applications that interact with the storage layer 114 of the data warehouse architecture 102 is maintained.

Further, the present invention provides following advantages:

The storage layer 114 understands the analytic SQL execution plans generated by the engine layer 106 and accelerates them by partially executing near-data.

The architectural feature that allows either executing the SQL queries via the data warehouse architecture 102 or accessing the same data directly connecting to the storage layer 114 using an API.

The present invention also discloses the architectural feature that allows the data warehouse architecture 102 to learn the topology (i.e., the addresses of the storage layer 114 that contain the objects identified by a list of keys).

The data warehouse architecture 102 uses the information associated with the topology 112 for generating the execution plan tree 116*a*, 116*b* with the execution nodes 132*a*, 132*b*, 132*c* . . . 132*n* marked for either execution in the engine layer 106 or in the specific partitions 126*a*, 126*b*, 126*c* . . . 126*n* associated with the storage layer 114 that contain the data required for execution of that node.

Existing cloud data warehouses have adopted a compute-storage disaggregation architecture in which the data is stored permanently in the cloud storage which is cheap and scalable and the analytic SQL engine (i.e., data warehouse, big data engine, or query engine) is in the temporary, use and destroy compute instances that are decoupled from the cloud storage. In such architectures, there is a problem of excessive compute resource consumption hence resulting in excessive compute costs due to slow network access paths (high latency and low bandwidth) in between. The present disclosure solves this problem by allowing the query engines to push down parts of the execution plan tree 116*a*, and 116*b* to be executed near data in the same storage layer 114.

Further, the execution of parts of SQL execution plans inside the storage layer 114 may access data via direct storage access using fast (low latency, and high bandwidth) access paths, such as Non-Volatile-Memory-Express (NVMe), Remote Direct Memory Access (RDMA), Peripheral Component Interconnect Express (PCIe), Serial Advanced Technology Attachment (SATA), NAS (Network Attached Storage), Storage Attached Network (SAN), RDMA over Ethernet (ROCE), InfiniBand, or any combination thereof.

Furthermore, the storage layer 114 may be required to send the results from the execution of parts of SQL execution plans (called partial results) to the engine layer 106 instead of raw data.

Since the partial results are much smaller in size than the stored raw data, the volume of data shipped over the network from the storage layer 114 to the engine layer 106 is much lower hence making the transfer faster.

Since the partial results are already pre-processed in the storage layer 114 and their size is much smaller than the raw data, the amount of compute resources required in the engine layer 106 is reduced. Hence, the overall costs are also reduced because computing is the most expensive resource in all the public clouds that contain the data.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for processing a Structured Query Language (SQL) query within a data warehouse architecture, the method comprising:

receiving, by one or more nodes associated with an engine layer, a SQL query from a client device, wherein the engine layer indicates component of the data warehouse architecture configured for receiving, interpreting, optimizing, and executing the SQL query against stored data;

receiving, by the one or more nodes associated with the engine layer, a topology from a storage layer in response to receiving the SQL query, wherein the topology indicates arrangement of the stored data among one or more partitions associated with the storage layer, and wherein the storage layer indicates component of the data warehouse architecture for storing and managing data;

determining, by the one or more nodes associated with the engine layer, an execution plan tree based on correlating the SQL query, a received data volume value, and pre-defined capabilities of the storage layer, wherein determining the execution plan tree comprises:

optimizing, by the engine layer, the received SQL query to determine the received data volume value indicating an amount of data volume that the storage layer sends to the engine layer for processing the received SQL query;

correlating the SQL query, the received data volume value, and the pre-defined capabilities of the storage layer; and assigning, one or more operations for processing the received SQL query to the engine layer and the storage layer, based on correlating the SQL query, the received data volume value, and the pre-defined capabilities of the storage layer, thereby determining the execution plan tree, and wherein the execution plan tree indicates the one or more operations to be executed by the engine layer and the storage layer corresponding to the received SQL query;

distributing, by the one or more nodes associated with the engine layer, a fragment of the execution plan tree to the storage layer based on the topology, for processing the one or more operations included in the execution plan tree such that the received or fetched data volume value and a computational load value of the engine layer is reduced, wherein distributing the fragment of the execution plan tree to the storage layer based on the topology comprises sending the fragment of the execution plan tree to the storage layer based on: identification of one or more execution nodes in the execution plan tree assigned to the storage layer, and the topology, wherein each of the one or more execution nodes include metadata thereby required for processing the received SQL query;

processing, by the storage layer, the one or more operations corresponding to the fragment of the execution plan tree;

sending, by the storage layer, processed results to the engine layer thereby reducing the received data volume value and the computational load value of the engine layer; and generating, by the engine layer, a compiled result-set by combining the processed results received from the storage layer with computed results generated within the engine layer, thereby passing the compiled result-set to the client device.

2. The method of claim 1, wherein the one or more nodes receiving the SQL query is a query coordinator and the one or more nodes determining the execution plan tree is a query optimizer.

3. The method of claim 1, wherein determining the execution plan tree further comprises:

parsing, by the engine layer, the received SQL query, indicating determining syntactic structure and semantics corresponding to the received SQL query; and receiving, by the engine layer, the pre-defined capabilities indicating computation characteristics of the storage layer.

4. The method of claim 1, wherein distributing the fragment of the execution plan tree to the storage layer based on the topology further comprises:

identifying the one or more execution nodes in the execution plan tree assigned to the storage layer, wherein the metadata indicates operation codes or functions for each of the one or more execution nodes, catalog content, list of objects, filters, predicates, projections, and data types, wherein the fragment of the execution plan tree is sent to the storage layer based on the identification and the topology such that the one or more nodes associated with the engine layer send the fragment to a corresponding one or more partitions associated with the storage layer, wherein the fragment of the execution plan tree includes at least one of: an individual execution node or a plurality of execution nodes.

5. The method of claim 1, wherein the storage layer of the data warehouse architecture is disaggregated and decoupled from the engine layer.

6. A method of processing a Structured Query Language (SQL) query within a data warehouse architecture, the method comprising:

receiving, by one or more nodes associated with an engine layer, a SQL query from a client device, wherein the engine layer indicates component of the data warehouse architecture configured for receiving, interpreting, optimizing, and executing the SQL query against stored data;

determining, by the one or more nodes associated with the engine layer, an execution plan tree based on correlating the SQL query, a received data volume value, and pre-defined capabilities of a storage layer, wherein determining the execution plan tree comprises:

optimizing, by the engine layer, the received SQL
query to determine the received data volume value
indicating an amount of data volume that the storage
layer sends to the engine layer for processing the
received SQL query;
correlating the SQL query, the received data volume
value, and the pre-defined capabilities of the storage
layer; and
assigning, one or more operations for processing the
received SQL query to the engine layer and the
storage layer, based on correlating the SQL query,
the received data volume value, and the pre-defined
capabilities of the storage layer, thereby determining
the execution plan tree,
and wherein the execution plan tree indicates the one or
more operations to be executed by the engine layer and
the storage layer corresponding to the received SQL
query;
sending, by the one or more nodes associated with the
engine layer, a fragment of the execution plan tree to
the storage layer for processing the one or more opera-
tions included in the execution plan tree such that the
received or fetched data volume value and a computa-
tional load value of the engine layer is reduced, wherein
the fragment of the execution plan tree is sent to the
storage layer based on: identification of one or more
execution nodes in the execution plan tree assigned to
the storage layer, and a topology received from the
storage layer, wherein each of the one or more execu-
tion nodes include metadata thereby required for pro-
cessing the received SQL query, and wherein the topol-
ogy indicates arrangement of the stored data among one
or more partitions associated with the storage layer;
processing, by the storage layer, the one or more opera-
tions corresponding to the fragment of the execution
plan tree;
sending, by the storage layer, processed results to the
engine layer thereby reducing the received data volume
value and the computational load value of the engine
layer; and
generating, by the engine layer, a compiled result-set by
combining the processed results received from the
storage layer with computed results generated within
the engine layer, thereby passing the compiled result-
set to the client device.
7. A system for processing a Structured Query Language
(SQL) query within a data warehouse architecture, wherein
the system comprises:
a memory; and
at least one processor in communication with the memory,
the at least one processor configured to
receive, by one or more nodes associated with an engine
layer, a SQL query from a client device, wherein the
engine layer indicates component of the data ware-
house architecture configured for receiving, interpret-
ing, optimizing, and executing the SQL query against
stored data;
receive, by the one or more nodes associated with the
engine layer, a topology from a storage layer in
response to receiving the SQL query, wherein the
topology indicates arrangement of the stored data
among one or more partitions associated with the
storage layer, and wherein the storage layer indicates
component of the data warehouse architecture for stor-
ing and managing data;
determine, by the one or more nodes associated with the
engine layer, an execution plan tree based on correlating the SQL query, a received data volume value, and
pre-defined capabilities of the storage layer, wherein to
determine the execution plan tree, the at least one
processor is configured to:
optimize, by the engine layer, the received SQL query to
determine the received data volume value indicating an
amount of data volume that the storage layer sends to
the engine layer for processing the received SQL query;
correlate the SQL query, the received data volume value,
and the pre-defined capabilities of the storage layer;
and
assign, one or more operations for processing the received
SQL query to the engine layer and the storage layer,
based on correlating the SQL query, the received data
volume value, and the pre-defined capabilities of the
storage layer, thereby determining the execution plan
tree,
and wherein the execution plan tree indicates the one or
more operations to be executed by the engine layer and
the storage layer corresponding to the received SQL
query;
distribute, by the one or more nodes associated with the
engine layer, a fragment of the execution plan tree to
the storage layer based on the topology, for processing
the one or more operations included in the execution
plan tree such that the received or fetched data volume
value and a computational load value of the engine
layer is reduced, wherein to distribute the fragment of
the execution plan tree to the storage layer based on the
topology, the at least one processor is configured to
send the fragment of the execution plan tree to the
storage layer based on: identification of one or more
execution nodes in the execution plan tree assigned to
the storage layer, and the topology, wherein each of the
one or more execution nodes include metadata thereby
required for processing the received SQL query;
process, by the storage layer, the one or more operations
corresponding to the fragment of the execution plan
tree;
send, by the storage layer, processed results to the engine
layer thereby reducing the received data volume value
and the computational load value of the engine layer;
and
generate, by the engine layer, a compiled result-set by
combining the processed results received from the
storage layer with computed results generated within
the engine layer, thereby passing the compiled result-
set to the client device.
8. The system of claim 7, wherein the one or more nodes
receiving the SQL query is a query coordinator and the one
or more nodes determining the execution plan tree is a query
optimizer.
9. The system of claim 7, wherein to determine the
execution plan tree, the at least one processor is configured
to:
parse, using the engine layer, the received SQL query,
indicating determining syntactic structure and seman-
tics corresponding to the received SQL query; and
receive, using the engine layer, the pre-defined capabili-
ties indicating computation characteristics of the stor-
age layer.
10. The system of claim 7, wherein the fragment of the
execution plan tree is distributed to the storage layer based
on the topology by:
identifying the one or more execution nodes in the execu-
tion plan tree assigned to the storage layer, wherein the
metadata indicates operation codes or functions for each of the one or more execution nodes, catalog content, list of objects, filters, predicates, projections, and data types, wherein the fragment of the execution plan tree is sent to the storage layer based on the identification and the topology such that the one or more nodes associated with the engine layer send the fragment to a corresponding one or more partitions associated with the storage layer, wherein the fragment of the execution plan tree includes at least one of: an individual execution node or a plurality of execution nodes.

11. The system of claim 7, wherein the storage layer of the data warehouse architecture is disaggregated and decoupled from the engine layer.

12. A system of processing a Structured Query Language (SQL) query within a data warehouse architecture, wherein the system comprises:

a memory; and at least one processor in communication with the memory, the at least one processor configured to:

receive, by one or more nodes associated with an engine layer, a SQL query from a client device, wherein the engine layer indicates component of the data warehouse architecture configured for receiving, interpreting, optimizing, and executing the SQL query against stored data;

determine, by the one or more nodes associated with the engine layer, an execution plan tree based on correlating the SQL query, a received data volume value, and pre-defined capabilities of a storage layer, wherein to determine the execution plan tree, the at least one processor is configured to:

optimize, by the engine layer, the received SQL query to determine the received data volume value indicating an amount of data volume that the storage layer sends to the engine layer for processing the received SQL query;

correlate the SQL query, the received data volume value, and the pre-defined capabilities of the storage layer; and assign, one or more operations for processing the received SQL query to the engine layer and the storage layer, based on correlating the SQL query, the received data volume value, and the pre-defined capabilities of the storage layer, thereby determining the execution plan tree, and wherein the execution plan tree indicates the one or more operations to be executed by the engine layer and the storage layer corresponding to the received SQL query;

send, by the one or more nodes associated with the engine layer, a fragment of the execution plan tree to the storage layer for processing the one or more operations included in the execution plan tree such that the received or fetched data volume value and a computational load value of the engine layer is reduced, wherein the fragment of the execution plan tree is sent to the storage layer based on: identification of one or more execution nodes in the execution plan tree assigned to the storage layer, and a topology received from the storage layer, wherein each of the one or more execution nodes include metadata thereby required for processing the received SQL query, and wherein the topology indicates arrangement of the stored data among one or more partitions associated with the storage layer;

process, by the storage layer, the one or more operations corresponding to the fragment of the execution plan tree;

send, by the storage layer, processed results to the engine layer thereby reducing the received data volume value and the computational load value of the engine layer; and generate, by the engine layer, a compiled result-set by combining the processed results received from the storage layer with computed results generated within the engine layer, thereby passing the compiled result-set to the client device.

* * * * *